United States Patent [19]

Wagner

[11] 4,164,469
[45] Aug. 14, 1979

[54] METHOD OF CLEANING PHENOL-CONTAINING WASTE WATERS

[75] Inventor: Armand Wagner, Esch, Luxembourg

[73] Assignee: ARBED - Acieries Reunies de Burbach-Eich-Dudelange S.A., Luxembourg, Luxembourg

[21] Appl. No.: 871,474

[22] Filed: Jan. 23, 1978

[30] Foreign Application Priority Data

Jan. 21, 1977 [LU] Luxembourg ............................ 76626

[51] Int. Cl.² .............................................. C02C 5/02
[52] U.S. Cl. .......................................... 210/40; 210/71
[58] Field of Search ................... 210/27, 30 A, 33, 40, 210/67, 71, 73 W, 79, 80, DIG. 26; 252/416–419, 421

[56] References Cited

U.S. PATENT DOCUMENTS

| | | | |
|---|---|---|---|
| 1,141,749 | 6/1915 | Alley | 182/113 |
| 2,254,745 | 9/1941 | Jannek | 210/40 |
| 3,408,289 | 10/1968 | Gustafson | 210/27 |
| 3,994,804 | 11/1976 | Kalvinskas et al. | 210/40 |
| 4,025,426 | 5/1977 | Anderson et al. | 210/40 |
| 4,036,750 | 7/1977 | Jaros et al. | 210/40 |

*Primary Examiner*—Charles N. Hart
*Assistant Examiner*—Ivars Cintins
*Attorney, Agent, or Firm*—Karl F. Ross

[57] ABSTRACT

A method of cleaning phenol-containing waste waters as derived from coke-producing, chemical and other industrial processes comprises treating the waste water, generally without any preconcentration of the phenol content thereof or other prior treatment, with a one-use adsorbent, namely, brown-coal coke. The brown-coal coke is then subjected at least in part to a thermal treatment which can be a coke-producing process or combustion.

1 Claim, 1 Drawing Figure

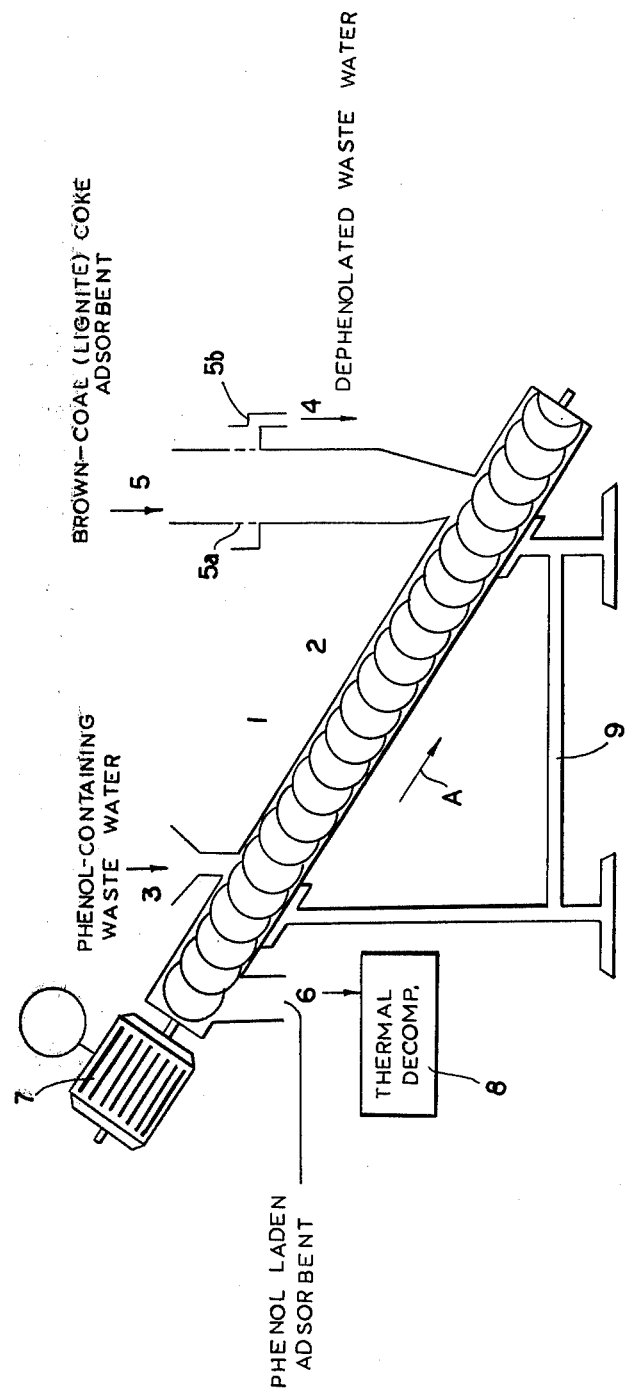

METHOD OF CLEANING PHENOL-CONTAINING WASTE WATERS

FIELD OF THE INVENTION

The present invention relates to the cleaning of phenol-containing waste waters and, more particularly, to the removal of phenols from waste waters as are obtained from coal-gassification, cokefication, chemical and industrial plants.

BACKGROUND OF THE INVENTION

Various chemical and industrial processes produce phenol-containing waste waters which are toxic to the environment and from which the phenols must be removed prior to disposal.

For example, phenol-containing waste waters are produced by the scrubbing or condensation of the gases derived from cokefication plants in which coke is produced for use in metallurgical industries, from coal-gassification plants and from a variety of chemical processes and other industrial plants. The phenol-containing waste waters may derive, as noted, from a scrubbing process or simply from the condensation of the gases produced in coke-burning, coal-burning and like combustion or thermal degradation reactions.

Dephenolation, i.e. the removal or recovery of phenol, from such waste waters can be affected in a variety of ways in accordance with teachings in the art. For example, it is known to dephenolate waste waters by a biological degradation of the phenol content thereof in synthetic biological environments and installations.

Alternatively, phenols can be removed by extraction or scrubbing with selective organic solvents, by steam distillation, or by adsorption on materials having a high surface activity, including active carbon, silica gel and synthethic-resin exchangers.

Depending upon the process and the phenol concentration of the waste water, the phenol can be recovered or the level of phenols in the waste water can be reduced to a negligible degree. In most cases, however, a recovery of the phenols is not practical since the expense for such recovery renders a process in which recovery is contemplated relatively impractical. Furthermore, the cost for phenol recovery from solvents or adsorbents is often excessive.

In the adsorption process, practical considerations have limited the adsorbent to active carbon.

An adsorption process for the removal of phenols from waste waters, using active carbons, has various problems associated with it. For example, apart from the phenols, there are other constituents of the waste water deposited upon the active carbon and cannot be removed readily therefrom. Such materials include resinous and asphalty materials. In addition, the desorption or regeneration process have a tendency to produce resinous and asphalty materials which are not completely released or destroyed in the active carbon so that the active carbon must be replaced more than is economically feasible and cannot be reused to the desired degree. Notwithstanding these disadvantages, a treatment of the active carbon for reuse is practically mandated by the high cost of the adsorbent.

One of the ways which has been proposed in order to increase the economy of active-carbon adsorption processes for the dephenolation of waste waters requires a pretreatment of the waste waters to remove the oily and tarry components thereof.

OBJECTS OF THE INVENTION

It is the principal object of the present invention to provide an improved process for the dephenolation of waste waters whereby the disadvantages of the earlier systems are obviated.

Another object of the invention to provide a process for the removal of phenols from waste waters which permits the dephenolation of the waste water without a pretreatment thereof to a low value such that the waste water after the dephenolation treatment can be discharged into the environment without danger.

SUMMARY OF THE INVENTION

These objects and others which will become apparent hereinafter are attained, in accordance with the present invention, in a process for the dephenolation of waste waters derived from the various sources described previously in which the waste water is treated with a low-cost single-use adsorbent and the phenol content is thereby reduced to a value which enables the waste water to be discharged without further treatment and which can be carried out without a pretreatment of the waste water. The adsorbent containing the phenols can be used in accordance with the present invention and does not have to be recovered for reuse in the dephenolation process.

The invention is based upon my surprising discovery that brown-coal or lignite coke constitutes a highly efficient single-use or one-way (disposable or destructible) absorbent for the aforedescribed process.

In other words the invention comprises treating the phenol-containing waste water with an adsorbent which consists of brown-coal or lignite coke and thereafter utilizing the brown-coal coke upon which the phenols are adsorbed. This use, according to the invention, consists at least in part on the thermal decomposition of the adsorbent containing the phenol.

The thermal treatment can be either a cokefication in a classical coking apparatus in admixture with commercial coking charges, e.g. the commercial coking charge of a coking furnace for a metallurgical, i.e. steel, plant. Alternatively, the thermal reaction can be an energy-producing combustion of the adsorbent containing the adsorbed components. In the first case, the adsorbent is combined with blast furnace coke or is converted to coke dust and in the cokefication process the phenols are completely decomposed thermally or are transformed into the tarry residues of the coke-producing process.

In the second case, the brown coal or lignite coke together with the adsorbed material is completely combusted to generate energy.

Brown coal or lignite coke is manufacture in large quantities for use as a sinter fuel and thus is of low cost and is commercially available so as to be highly suitable for the practice of the process of the present invention. It has been found that the brown coal or lignite coke can be used as obtained from the conventional processes or can be subjected to a comminution and sifting to produce a particle size in the range of 0.5 and 10 mm which has been found to be most effective for the adsorption process.

The waste water to be filtered through the adsorbent of the present invention requires no intensive precleaning operation in order to remove the tarry and oily components which may be present therein. The waste water thus can be used as it is obtained, i.e. at a temperature up to 80° C. and can be treated at any temperature between 0° C. and 80° C. economically in accordance with the present invention.

The adsorption can be carried out either discontinuously with the help of one or more filter beds or continuously in counter-flow through a moving filter bed. The adsorbent as obtained by either process is subjected to further use in the manner described. When the further utilization of the adsorbent is to be effected in a coke-producing plant, it is mixed with the charge for the coking furnace. It also may be mixed with coke previously produced and used for combustion in other industrial operations.

A combination of the process of the present invention with other cleaning processes as precleaning or aftercleaning operations is also possible. These pre- or aftercleaning operations can include removal of ammonia, cyanides or sulfur compounds. When the treatment is to include a chlorination, however, it is desirable to first remove the phenols from the waste water by the adsorption process described previously.

The process of the present invention has numerous advantages:

(a) The process can be carried out at low cost since the adsorbent used is a commercially available low-cost material which does not have to be reprocessed.

(b) The waste water can be treated without precleaning, i.e. with the tar and oil components remaining therein during the process.

(c) The dephenolation is affected to almost complete removal of phenols and, at the very least, to a phenol content which is tolerable to the point that the waste water can be subsequently discharged and need not undergo biological degradation before being released into the environment.

(d) The process of the present invention eliminates any need for expensive regeneration or repetitive use of the adsorbent.

(e) The adsorbent resulting from the process can be economically utilized without expensive after treatment.

(f) A combination of the process of the present invention with other cleaning processes is easily effected and the waste water can have a high degree of purity and freedom from contaminants so that it can be simply deposited in open vessels or channels.

BRIEF DESCRIPTION OF THE DRAWING

The sole FIGURE of the drawing illustrates a preferred apparatus for carrying out the process of the present invention.

SPECIFIC DESCRIPTION

For the cleaning or precleaning of the waste water in accordance with the present invention, as shown in FIG. 1, the apparatus can comprise a downwardly inclined cylindrical housing 1 forming the enclosure for a conveyor screw 2 which is driven by a motor 7 connected to this screw and its upper end. A hopper 5, consisting of an upright column, communicates with the lower end of the cylindrical housing 1 and is formed at a level approximately corresponding to the level of an inlet 3, with a perforated wall 5a and an overflow chamber 5b surrounding this perforated wall.

The waste water is fed to the cylindrical housing 1 through the inlet 3 and flows downwardly (arrow A) against the upward movement of the adsorbent which is advance in the upward direction by the rotation of the worm. The adsorbent is introduced through the column 5 and the liquid rises to the perforations 5a and is collected in the trough 5b being carried away through the outlet 4. The adsorbent is recovered at the outlet 6 and is subjected to thermal decomposition as represented by the block 8. The apparatus is mounted upon the support represented at 9.

In the apparatus shown in the drawing, therefore, the liquid phase moves in counterflow to the adsorbent during the adsorption process.

SPECIFIC EXAMPLES

In a first series of tests, the waste water obtained from the scrubbing of the gases of a metallurigical coke-producing plant, without precleaning and at a rate of 120 l/hr was fed continuously in counterflow through the apparatus shown in the drawing to an adsorbent consisting of brown coal or lignite coke having a particle size in the range of 0.5 and 10 mm. The brown coal or lignite coke quantity was varied by controlling the worm speed between 20 and 55 revolutions per hour and corresponded to 2.0 to 6.5 kg/hr.

With a ratio (by volume) of the water to the adsorbent of about 30:1, the following results were obtained: reduction of the phenol content from 713 mg/l to 4 mg/l, reduction of the cyanide content from 27 mg/l to 10 mg/l and reduction of the sulfide content from 176 mg/l to 57 mg/l.

A waste water containing less phenols was subjected first to a lime treatment in a settling tank to remove ammonia and was then processed in the manner described above in a second series of tests. In this case, the phenol content was reduced from 13.5 mg/l to 0.86 mg/l, the tar content was reduced from 13.4 mg/l to 3.2 mg/l, and the chemical oxygen demand was reduced from 1004 mg/l to 628 mg/l. The brown-coal coke laden with the phenols is added to the coal mixture for a coke-producing plant as a leaning component and did not adversely affect the coke-producing process. A portion of the adsorbent laden with the phenols was also burned to generate electrical energy in a thermal electrical energy producing plant.

I claim:

1. A process for the removal of phenols from a waste water containing same, comprising the steps of:
   (a) passing the phenol-containing waste water in a counterflow with a brown-coal coke advanced by a screw conveyor to adsorb phenols from said waste water;
   (b) recovering the phenolated brown-coal coke;
   (c) mixing the phenolated brown-coal coke recovered in step (b) with a charge of metallurgical coking coal;
   (d) coking the mixture of phenolated coke and coking coal in a coking charge in a coking furnace for producing coke for consumption in a metallurgical process; and
   (e) introducing the coke produced in step (d) into said metallurgical process, thereby consuming the phenolated brown-coal coke.

* * * * *